(12) United States Patent
Kobayashi

(10) Patent No.: US 11,113,583 B2
(45) Date of Patent: Sep. 7, 2021

(54) OBJECT DETECTION APPARATUS, OBJECT DETECTION METHOD, COMPUTER PROGRAM PRODUCT, AND MOVING OBJECT

(71) Applicant: KABUSHIKI KAISHA TOSHIBA, Tokyo (JP)

(72) Inventor: Daisuke Kobayashi, Kunitachi Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 41 days.

(21) Appl. No.: 16/544,532

(22) Filed: Aug. 19, 2019

(65) Prior Publication Data
US 2020/0302222 A1 Sep. 24, 2020

(30) Foreign Application Priority Data

Mar. 18, 2019 (JP) .............................. JP2019-050503

(51) Int. Cl.
G06K 9/62 (2006.01)
G06N 3/04 (2006.01)
G06N 3/08 (2006.01)

(52) U.S. Cl.
CPC ........... *G06K 9/629* (2013.01); *G06K 9/6232* (2013.01); *G06N 3/04* (2013.01); *G06N 3/08* (2013.01)

(58) Field of Classification Search
CPC ........ G06N 3/0454; G06N 3/08; G06N 20/00; G06T 2207/20084; G06T 2207/20016
See application file for complete search history.

(56) References Cited

U.S. PATENT DOCUMENTS

| | | | |
|---|---|---|---|
| 2017/0177972 A1* | 6/2017 | Cricri | G06K 9/6217 |
| 2017/0262995 A1 | 9/2017 | Li et al. | |
| 2020/0356802 A1* | 11/2020 | Zhao | G05D 1/0231 |

FOREIGN PATENT DOCUMENTS

JP 2018-077829 A 5/2018

OTHER PUBLICATIONS

Dollár et al., "The Fastest Pedestrian Detector in the West" BMVC, 2010, pp. 1-11.
Liu et al., "SSD: Single Shot MultiBox Detector", European conference on computer vision. Springer, Cham, 2016, pp. 1-17.
(Continued)

*Primary Examiner* — Ross Varndell
(74) *Attorney, Agent, or Firm* — Knobbe, Martens, Olson & Bear, LLP

(57) ABSTRACT

An object detection apparatus includes a calculation section, a first generation section, and a second generation section. The calculation section calculates a plurality of first feature maps from an input image. The first generation section generates a spatial attention map for which a higher first weighted value is defined for an element having a higher relation in terms of a first space on the basis of the first feature maps. The second generation section generates a plurality of second feature maps by performing weighting on each of the first feature maps in accordance with the first weighted value indicated for the spatial attention map. A detection section detects an object included in an input image by using the second feature maps.

11 Claims, 13 Drawing Sheets

(56) References Cited

OTHER PUBLICATIONS

Ren et al., "Faster R-CNN: Towards Real-Time Object Detection with Region Proposal Networks", Advance in Neural Information Processing System, NIPS, 2015.
Feichtenhofer et al., "Detect to Track and Track to Detect", ICCV, IEEE, 2017, pp. 3038-3046.
Simonyan et al., "Very Deep Convolutional Networks for Large-Scale Image Recognition", arXiv:1409.1556, 2015, pp. 1-14.
Wang et al., "Non-local Neural Networks", CVPR, IEEE, 2018, pp. 7794-7803.
He et al., "Deep Residual Learning for Image Recognition", CVPR, IEEE, 2016, pp. 770-778.
Fan et al., "Multi-Level Contextual RNNs With Attention Model for Scene Labeling" IEEE Transactions on Intelligent Transportation Systems, 19(11):3475-3485 (Nov. 2018), pp. 3475-3485.
Zhang et al., "Self-Attention Generative Adversarial Networks" Proceedings of the $36^{th}$ International Conference on Machine Learning, Long Beach California (2019), pp. 1-10.

\* cited by examiner

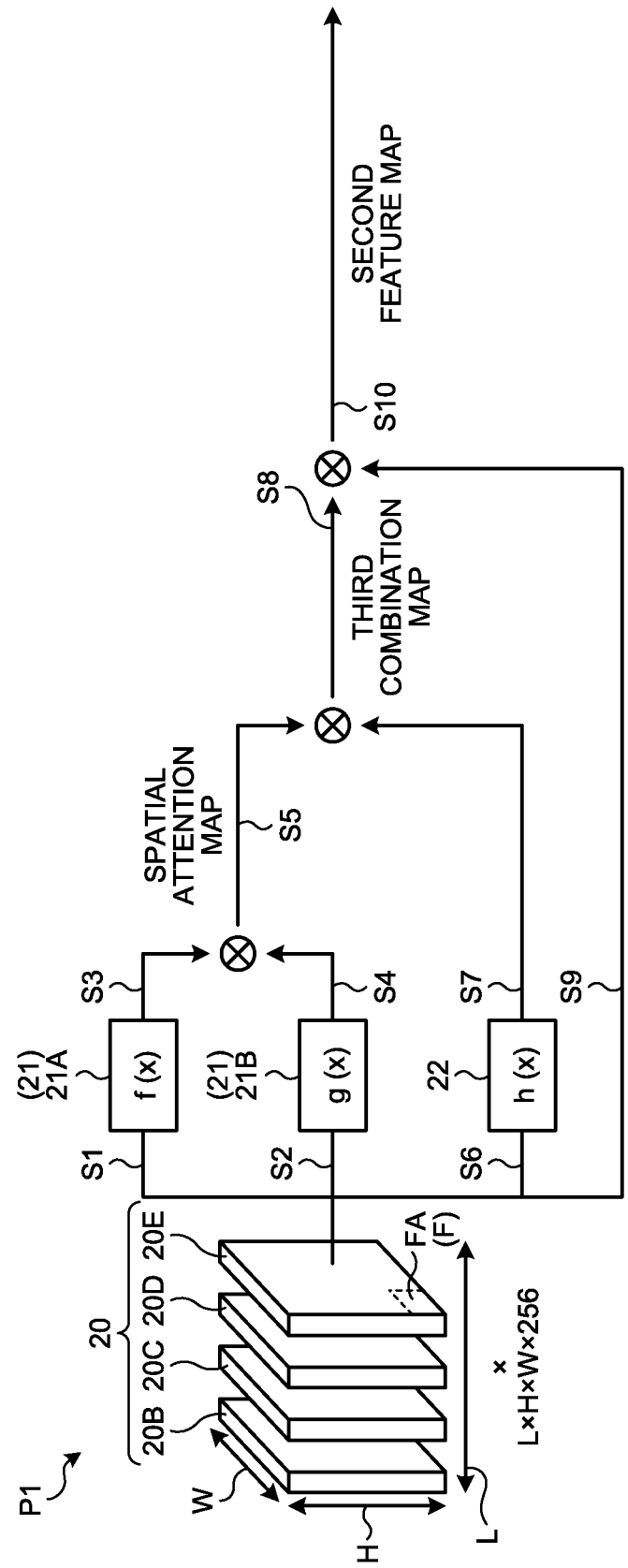

LHW×256

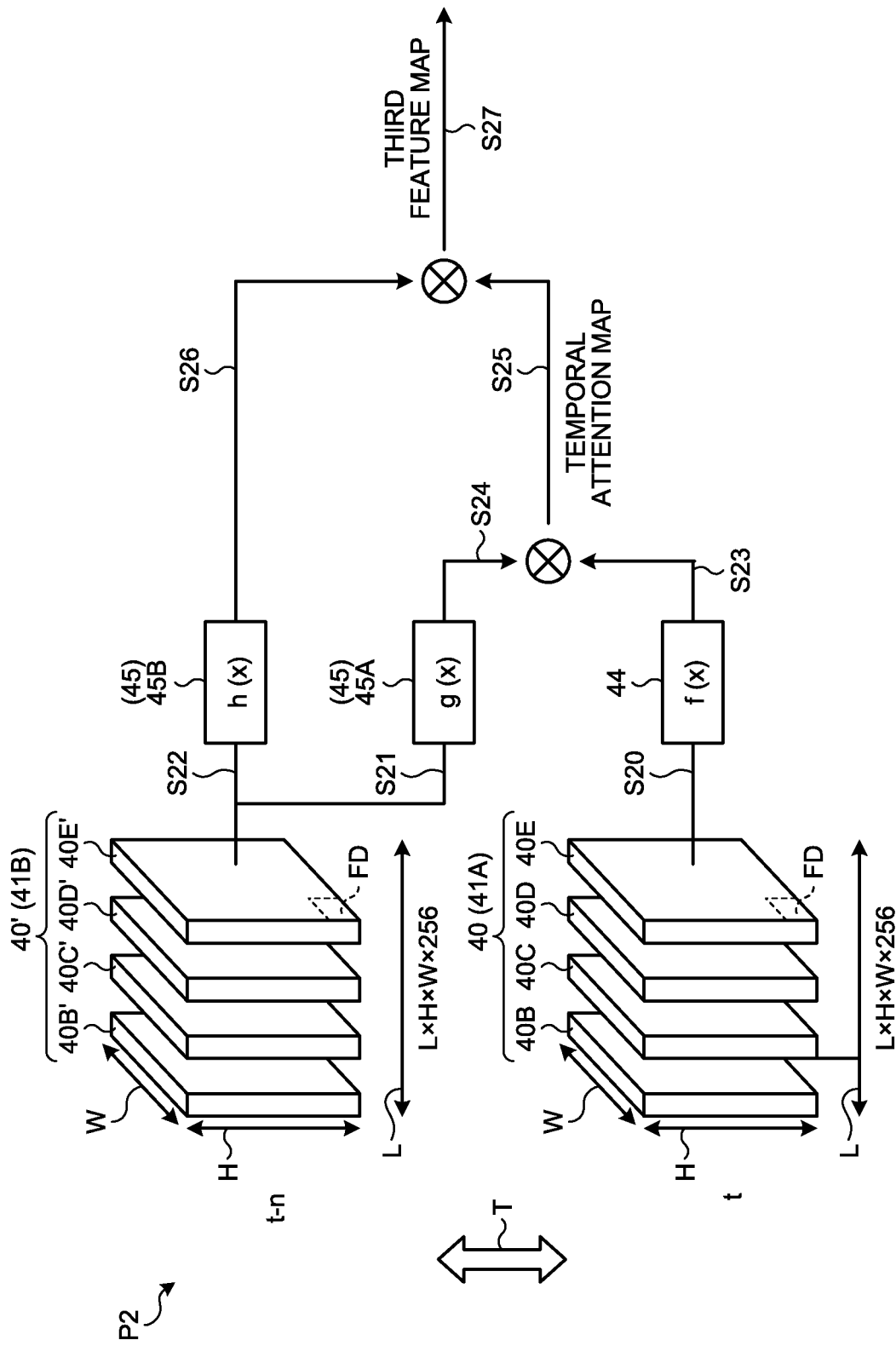

OBJECT DETECTION APPARATUS, OBJECT DETECTION METHOD, COMPUTER PROGRAM PRODUCT, AND MOVING OBJECT

CROSS-REFERENCE TO RELATED APPLICATIONS

This application is based upon and claims the benefit of priority from Japanese Patent Application No. 2019-050503, filed on Mar. 18, 2019; the entire contents of which are incorporated herein by reference.

FIELD

Embodiments described herein relate generally to an object detection apparatus, an object detection method, a computer program product, and a moving object.

BACKGROUND

There has been known a technology of detecting an object included in an input image. For example, a plurality of images having different resolutions is generated from the input image by using, for example, a convolutional neural network (CNN). A technology is known for detecting an object by extracting features from the generated images.

However, in the related art, the object is detected by simply combining the images having different resolutions or calculating the sum of elements included in the images. As such, in the related art, since object detection in accordance with local features is performed, there is a case where object detection accuracy is reduced. Examples of related art are described in Dollar, Piotr, Serge, J. Belongie, and Pietro Perona. "The fastest pedestrian detector in the west." BMVC 2010, 2010, and Liu Wei, et al. "Ssd: Single shot multibox detector." European conference on computer vision. Springer, Cham, 2016.

The embodiments described herein solve the aforementioned problems, and an object of the embodiments is to provide an object detection apparatus, an object detection method, a computer program product, and a moving object, by which object detection accuracy can be improved.

BRIEF DESCRIPTION OF THE DRAWINGS

FIG. 3A is an explanation diagram of the generation of a spatial attention map and a second feature map;
FIG. 8A is an explanation diagram of the generation of a temporal attention map and a third feature map.

DETAILED DESCRIPTION

Hereinafter, with reference to the accompanying drawings, an object detection apparatus, an object detection method, a computer program product, and a moving object will be described in detail.

First Embodiment

Figure 1:
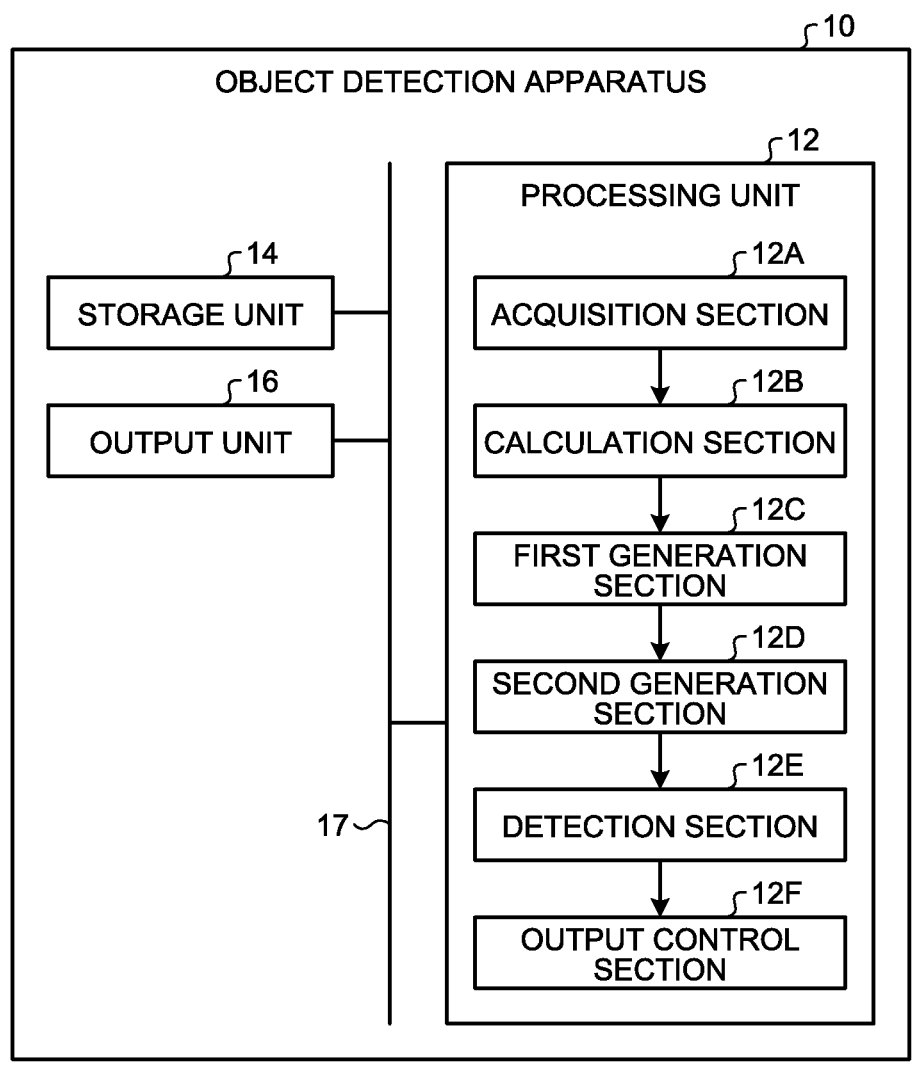
FIG. 1 is a block diagram of an object detection apparatus.

FIG. 1 is a block diagram illustrating an example of a configuration of an object detection apparatus 10 of the present embodiment.

The object detection apparatus 10 is an apparatus that detects an object included in an input image.

The object detection apparatus 10 includes a processing unit 12, a storage unit 14, and an output unit 16. The processing unit 12, the storage unit 14, and the output unit 16 are connected to one another via a bus 17 so that data or signals can be exchanged.

The storage unit 14 stores therein various types of data. The storage unit 14, for example, is a semiconductor memory device such as a random access memory (RAM) and a flash memory, a hard disk, an optical disc, and the like. In addition, the storage unit 14 may be a storage device provided outside the object detection apparatus 10. Furthermore, the storage unit 14 may be a storage medium. Specifically, the storage medium may be a medium having downloaded and stored or temporality stored a computer program or various types of information via a local area network (LAN), the Internet, and the like. Furthermore, the storage unit 14 may be composed of a plurality of storage media.

The output unit 16 has at least one of a display function of displaying various types of information, a sound output function of outputting sound, and a communication function of communicating data with an external device. The external device is a device provided outside the object detection apparatus 10. It is sufficient if the object detection apparatus 10 and the external device are communicable with each other via a network and the like. For example, the output unit 16 is configured by combining at least one of a well-known display device, a well-known speaker, and a well-known communication device.

The processing unit 12 includes an acquisition section 12A, a calculation section 12B, a first generation section 12C, a second generation section 12D, a detection section 12E, and an output control section 12F.

The acquisition section 12A, the calculation section 12B, the first generation section 12C, the second generation section 12D, the detection section 12E, and the output control section 12F, for example, are implemented by one or a plurality of processors. For example, each of the sections may be implemented by execution of computer programs by a processor such as a central processing unit (CPU), that is, software. Each of the sections may be implemented by a processor such as a dedicated IC, that is, hardware. Each of the sections may be implemented using software and hardware. In the case of using a plurality of processors, each processor may implement one of the sections or two or more of the sections.

Figure 2:
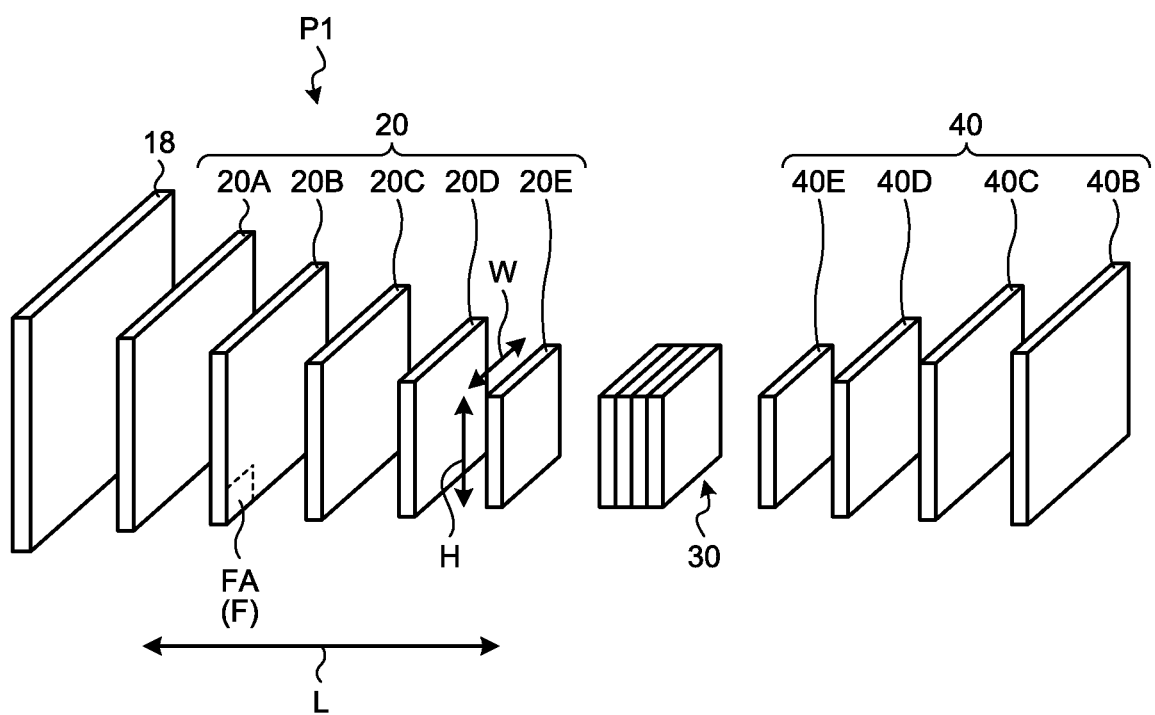
FIG. 2 is a schematic diagram of a process performed by a processing unit.

FIG. 2 is a schematic diagram of a process performed by the processing unit 12 of the present embodiment. In the present embodiment, the processing unit 12 generates a plurality of first feature maps 20 from an input image 18. Then, the processing unit 12 generates a spatial attention map 30 by using the first feature maps 20. The processing unit 12 generates a second feature map 40 by weighting the first feature maps 20 by using the generated spatial attention map 30. The processing unit 12 detects an object included in the input image 18 by using the second feature map 40. Details of the input image 18, the first feature maps 20, the spatial attention map 30, and the second feature map 40 will be described later.

Returning to FIG. 1, each section of the processing unit 12 will be described in detail.

The acquisition section 12A acquires the input image 18. The input image 18 is image data of a target from which an object is detected.

The input image 18, for example, may be any of a bitmap image in which a pixel value has been defined for each pixel, and a vector image. In the present embodiment, a case where the input image 18 is the bitmap image will be described as an example. When the input image 18 is the vector image, it is sufficient if the processing unit 12 converts the vector image into the bitmap image.

It is sufficient if the input image 18 is stored in the storage unit 14 in advance. Then, the acquisition section 12A acquires the input image 18 by reading the input image 18 from the storage unit 14. Alternatively, the acquisition section 12A may acquire the input image 18 from the external device or a capturing device via the output control section 12F. The capturing device is a well-known device that obtains captured image data by capturing. The acquisition section 12A may acquire the input image 18, which is the captured image data, by receiving the captured image data from the capturing device.

The calculation section 12B generates the first feature maps 20 from the input image 18. For example, as illustrated in FIG. 2, the calculation section 12B generates the first feature maps 20 from one input image 18. FIG. 2 illustrates a case of generating five first feature maps 20 (a first feature map 20A to a first feature map 20E) as an example. It is sufficient if the number of first feature maps 20 generated by the calculation section 12B is plural, and the number is not limited.

The first feature map 20 is a map for which a feature amount is defined for each element FA. The element FA indicates each area obtained by dividing the first feature map 20 into a plurality of areas. The size of the element FA is determined by a kernel used when the first feature map 20 is generated. There is a case where the kernel is referred to as a filter. Specifically, the element FA of the first feature map 20 corresponds to the pixel area of one or more pixels in the input image 18 used as the calculation source of the first feature map 20.

The feature amount is a value representing the feature of each element FA. The feature amount is extracted from the input image 18 for each element FA by the kernel used when the first feature map 20 is calculated. The feature amount, for example, is a value in accordance with the pixel value of a corresponding pixel in the input image 18. For extracting the feature amount, it is sufficient if a well-known image processing technology is used.

The first feature maps 20 have different feature amounts of at least some elements FA.

Specifically, for example, in the present embodiment, the first feature maps 20 differ from each other in at least one of a resolution and a scale. A difference in the scale indicates a difference in at least one of a magnification rate and a reduction rate.

The calculation section 12B calculates the first feature maps 20 that differ in at least one of the resolution and the scale, from one input image 18. By this calculation, the calculation section 12B generates the first feature maps 20 having different feature amounts of at least some elements FA.

It is sufficient if the calculation section 12B calculates the first feature maps 20 from the input image 18 by using a well-known method. For example, the calculation section 12B calculates the first feature maps 20 (a first feature map 20A to a first feature map 20E) from the input image 18 by using the well-known convolutional neural network (CNN).

In such a case, the calculation section 12B calculates each of a plurality of tensors, which are obtained from the input image 18 by repeating the well-known convolutional operation, as the first feature map 20.

In addition, the calculation section 12B may also calculate the first feature maps 20 from the input image 18 by performing down sampling feature maps referred to as pooling on the input image 18. Furthermore, the calculation section 12B may also calculate the first feature maps 20 by alternately repeating the convolutional operation and the pooling on the input image 18.

In the present embodiment, a mode in which the calculation section 12B calculates the first feature maps 20 (the first feature map 20A to the first feature map 20E) that differ in at least resolution, by sequentially repeating the convolutional operation of the input image 18 using the CNN, will be described as an example.

As illustrated in FIG. 2, the first feature maps 20 (the first feature map 20A to the first feature map 20E) are generated from the input image 18.

Returning to FIG. 1, a description will be continued. Next, the first generation section 12C will be described. The first generation section 12C generates the spatial attention map 30 on the basis of the first feature maps 20. It is sufficient if the first feature maps 20 used to generate the spatial attention map 30 is plural. Therefore, the first generation section 12C is not limited to a mode in which all the first feature maps 20 calculated by the calculation section 12B are used. In the present embodiment, a description will be provided for a mode in which the first generation section 12C uses the first feature maps 20 (the first feature map 20B to the first feature map 20E), which are some of the first feature maps 20 (the first feature map 20A to the first feature map 20E) calculated by the calculation section 12B, in order to generate the spatial attention map 30.

FIG. 3A is an explanation diagram of an example of the generation of the spatial attention map 30 and the second feature map 40.

As illustrated in FIG. 3A, the first generation section 12C generates the spatial attention map 30 from the first feature maps 20 (the first feature map 20B to the first feature map 20E).

Figure 3B:
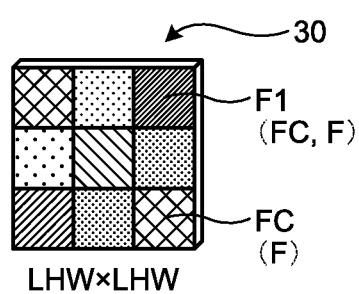
FIG. 3B is a schematic diagram of the spatial attention map.

FIG. 3B is a schematic diagram illustrating an example of the spatial attention map 30. The spatial attention map 30 is a map for which a weighted value is defined for each element F. The weighted value of each element F of the spatial attention map 30 is updated by generation (learning) by the first generation section 12C. The higher the updated weighted value of the element F of the spatial attention map 30, the higher the relation in terms of a first space P1. Therefore, after the update, that is, in each element F of the generated spatial attention map 30, a higher weighted value (a first weighted value) is defined for an element F having a higher relation in terms of the first space P1. In other words, in the generated spatial attention map 30, for a first element F1, which is an element F having the relation in terms of the first space P1, a first weighted value higher than that of the other elements F, other than the first element F1, is defined. Furthermore, in the spatial attention map 30, a lower weighted value is defined for an element F having a lower relation in terms of the first space P1. When the elements of the map to be described in the present embodiment and the following embodiments are generically described, there is a case where they are described as the element F.

As illustrated in FIG. 3A, the first space P1 is a multi-dimensional space defined by a positional direction in the first feature maps 20 and a relational direction between the first feature maps 20.

The positional direction in the first feature maps 20 is a direction along a two-dimensional plane that is an arrangement surface of the elements FA of the first feature map 20. The arrangement surface corresponds to an arrangement surface of the pixels of the input image 18.

Specifically, the arrangement surface of the elements FA of the first feature map 20 is a two-dimensional plane formed by a first positional direction (see a direction of an arrow H), which is a specific arrangement direction of the elements F, a second positional direction (a direction of an arrow W), which is perpendicular to the first positional direction H, along the arrangement surface of the elements FA of the first feature map 20. In the following description, there is a case where the first positional direction is referred to as the first positional direction H and the second positional direction is referred to as the second positional direction W.

The relational direction between the first feature maps 20 means an arrangement direction when the first feature maps 20 are arranged in the resolution order or the scale order. That is, when the first feature maps 20 having different resolutions are calculated, the relational direction coincides with an increase or decrease direction of the resolution. Furthermore, when the first feature maps 20 having different scales are calculated, the relational direction coincides with a magnification or reduction direction of the scale. In the case of the example illustrated in FIG. 3A, the relational direction coincides with the direction indicated by an arrow L. In the following description, there is a case where the relational direction is referred to as a relational direction L.

Therefore, the first space P1 is a three-dimensional space defined by the first positional direction H, the second positional direction W, and the relational direction L.

The weighted value of each element F of the spatial attention map 30 is updated by generation (learning) by the first generation section 12C. The higher the updated weighted value of the element F, the higher the relation in terms of the first space P1.

The element group of the elements FA corresponding to each other between the first feature maps 20 means that the pixel of the input image 18, which is the calculation source used to calculate each of the elements F belonging to the element group, is a pixel at the same pixel position. That is, the elements F belonging to the element group are elements F generated from the pixel at the same pixel position in the input image 18 and are elements F in the first feature maps 20 different from each other.

In the present embodiment, the first generation section 12C generates the spatial attention map 30 from the first feature map 20 by the following method.

Specifically, the first generation section 12C calculates the inner product result of a vector sequence of the feature amounts along each of the relational direction L and the positional directions (the first positional direction H and the second positional direction W) for each element group of the elements FA corresponding to each other between the first feature maps 20.

In the present embodiment, a case where the type of the feature amounts is 256 will be described as an example. There is a case where the number of types of the feature amounts is referred to as the number of channels. The type of the feature amounts is not limited to 256. When the type of the feature amounts is 256, the first generation section 12C calculates the inner product result of a vector sequence of 256 types of the feature amounts along each of the first positional direction H, the second positional direction W, and the relational direction L.

Then, the first generation section 12C generates the spatial attention map 30 in which the inner product result of each element F is defined for each element F as the first weighted value.

Therefore, for example, the spatial attention map 30 illustrated in FIG. 3B is generated. As described above, the spatial attention map 30 is a map for which a weighted value is defined for each element FC. The weighted value of each element FC of the spatial attention map 30 is updated by generation (learning) by the first generation section 12C. The higher the updated weighted value of each element FC of the spatial attention map 30, the higher the relation in terms of the first space P1. The element FC of the spatial attention map 30 corresponds to the element F of the first feature map 20.

Returning to FIG. 3A, a description will be continued. The first generation section 12C may generate the spatial attention map 30 by using a plurality of combination maps in which the first feature maps 20 have been subjected to linear embedding with different weight values. The spatial attention map 30 is generated using the combination maps, so that it is possible to improve the accuracy of the spatial attention map 30.

Specifically, for example, the first generation section 12C generates a first combination map 21 in which respective feature amounts of the elements F included in each element group are linearly embedded for each element group of the elements F corresponding to each other between the first feature maps 20 (the first feature map 20B to the first feature map 20E).

Figure 3C:
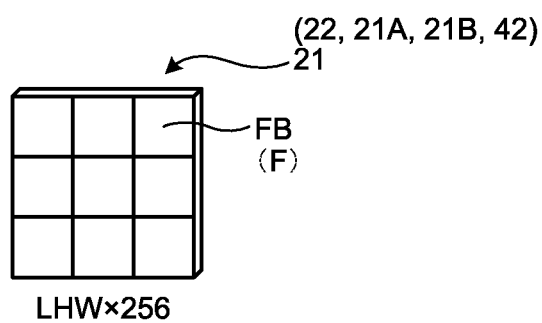
FIG. 3C is a schematic diagram of a first combination map.

FIG. 3C is a schematic diagram illustrating an example of the first combination map 21. Elements FB constituting the first combination map 21 are composed of the element group of the elements FA corresponding to each other between the first feature maps 20.

Therefore, the first combination map 21 is a tensor of LHW×256. L corresponds to the aforementioned relational direction L, H corresponds to the aforementioned first positional direction H, and W corresponds to the aforementioned second positional direction W. Furthermore, the feature amounts of the respective elements FB included in the first combination map 21 are values obtained by linearly embedding the respective feature amounts of the elements F, which are included in each element group, in each element group of the elements FA corresponding to each other between the first feature maps 20.

In the present embodiment, it is sufficient if the first generation section 12C generates the first combination map 21 by using the well-known linear embedding method.

Returning to FIG. 3A, a description will be continued. In the present embodiment, the first generation section 12C generates a plurality of first combination maps 21 (a first combination map 21A and a first combination map 21B), which have different weight values for the linear embedding, from the first feature maps 20 (see step S1 and step S2). The configurations of the first combination map 21A and the first combination map 21B are the same as the configuration of the first combination map 21 illustrated in FIG. 3C.

Each element group of the elements FA corresponding to each other between the first feature maps 20 is represented by "x". By so doing, the first combination map 21 composed of the elements FB in the element group is represented by a function using the element group "x" of the first feature map 20. Specifically, for example, the first combination map 21A is represented by f(x). Furthermore, the first combination map 21B is represented by g(x).

Then, the first generation section 12C generates the spatial attention map 30 in which the inner product result of the vector sequence of the feature amounts along each of the relational direction L and the positional directions (the first positional direction H and the second positional direction W) is defined as the first weighted value for each element FB corresponding to each other between the first combination maps 21 (the first combination map 21A and the first combination map 21B) (step S3, step S4, and step S5).

For example, the first generation section 12C uses the well-known Softmax function and generates the spatial attention map 30 by using the following Equation (1).

$$\alpha_{j,i} = \frac{\exp(f(x_i)^T g(x_j))}{\sum_{i=1}^{N} \exp(f(x_i)^T g(x_j))} \quad (1)$$

In Equation (1) above, $\alpha_{i,j}$ indicates a tensor of LHW× LHW. $f(X_i)$ and $g(x_j)$ indicate a tensor of LHW×256. In $f(X_i)^T$, T represents the transposition of $f(X_i)$ and indicates a tensor of 256×LHW. i and j indicate the position of LHW.

The first generation section 12C puts the feature amounts of the corresponding element FB of each of the first combination map 21A and the first combination map 21B into Equation (1) above. With this processing, the first generation section 12C calculates the first weighted value for each element FC of the spatial attention map 30. Then, the first generation section 12C generates the spatial attention map 30 in which the first weighted value is defined for each element FC. Therefore, the spatial attention map 30 becomes the spatial attention map 30 of the tensor of LHW×LHW (see FIG. 3B).

Returning to FIG. 1, a description will be continued. The second generation section 12D performs weighting on each of the first feature maps 20 in accordance with the first weighted value indicated for the spatial attention map 30. With this processing, the second generation section 12D generates the second feature map 40 corresponding to each of the first feature maps 20.

The following description will be given using FIG. 3A. For example, the second generation section 12D generates a second combination map 22 from the first feature maps 20 (step S6). The second generation section 12D generates the second combination map 22 from the first feature maps 20 in the same manner as the first combination map 21. In such a case, the second generation section 12D generates the second combination map 22 by performing linear embedding with a weight value different from that of the first combination map 21. Therefore, as illustrated in FIG. 3C, the second combination map 22 becomes a combination map for which the element groups of the elements FA corresponding to each other between the first feature maps 20 are defined as one element FB.

Returning to FIG. 3A, a description will be continued. Hereinafter, each of the element groups of the elements FA corresponding to each other between the first feature maps 20 is represented by "x". By so doing, the second combination map 22 composed of the elements FB in the element group is represented by a function using the element group "x" of the first feature map 20. Specifically, for example, the second combination map 22 is represented by h(x).

Furthermore, as illustrated in FIG. 3A, the second generation section 12D performs weighting on the second combination map 22 by using the spatial attention map 30 (step S5 and step S7), thereby generating the second feature map 40 (step S8 and step S10).

In the present embodiment, the second generation section 12D performs weighting on the second combination map 22 by using the spatial attention map 30 (step S5 and step S7), thereby generating a third combination map (step S8). Then, the second generation section 12D generates the second feature map 40 by using the third combination map (step S10).

For example, the second generation section 12D performs weighting on the feature amount of each element FB, included in the second combination map 22, in accordance with the first weight value defined for the corresponding element FC indicated for the spatial attention map 30.

Specifically, the second generation section 12D performs addition or multiplication of the first weight value of the corresponding element FC in the spatial attention map 30 on the feature amount of each element FB included in the second combination map 22. The element FC corresponding to the element FB means that pixel positions in the input image 18 serving as the calculation source are the same. Hereinafter, as a weighting method, a case of using the multiplication will be described as an example. Then, the second generation section 12D obtains the multiplication result as a feature amount after the weighting for each element FB of the second combination map 22. In the same manner, the second generation section 12D generates the third combination map by performing the same processing on all the elements FB of the second combination map 22.

Figure 3D:
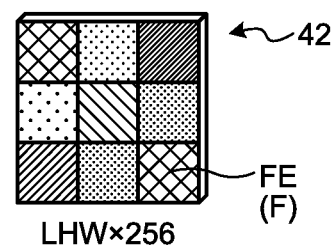
FIG. 3D is a schematic diagram of a third combination map.

FIG. 3D is a schematic diagram of an example of a third combination map 42. The third combination map 42 is composed of a plurality of elements FE. The elements FE correspond to the elements FB included in the second combination map 22. That is, each element FE of the third combination map 42 corresponds to each of the element groups of the elements FA corresponding to each other between the first feature maps 20. Therefore, the third combination map 42 is a tensor of LHW×256. Furthermore, feature amounts after the weighting using the spatial attention map 30 are defined for the elements FE constituting the third combination map 42.

Returning to FIG. 3A, a description will be continued. The second generation section 12D transforms the third combination map 42 into L×H×W×256 and separates the third combination map 42 into a plurality of second feature maps 40 (step S10).

Figure 3E:
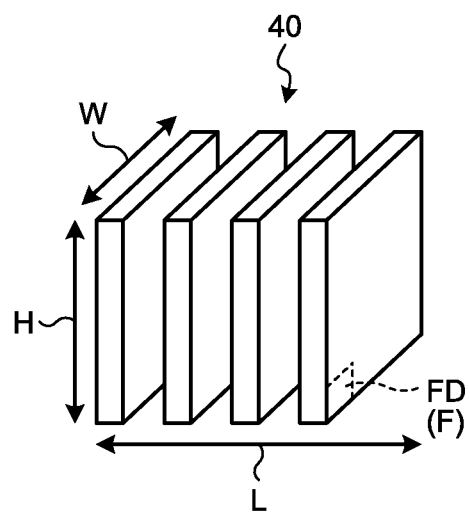
FIG. 3E is a schematic diagram of the second feature map.

FIG. 3E is a schematic diagram illustrating an example of the second feature maps 40. For elements FD constituting the second feature maps 40, values obtained by correcting the feature amounts of the elements FA of the first feature map 20 by the spatial attention map 30 are defined. In other words, the elements FD constituting each of the second feature maps 40 have a characteristic that the feature amount of the element FD having a relation in terms of the first space P1 has a value higher (larger) than that of the feature amount of other elements F within the element FD.

Specifically, the second generation section 12D generates the second feature map 40 by using Equation (2) below.

$$y_j = \sum_{i=1}^{N} \alpha_{j,i} h(x_i) \qquad (2)$$

In Equation (2) above, "y" indicates the value of the element FD of the second feature map 40. $\alpha_{j,i}$, j, and i are the same as those of the aforementioned Equation (1). $h(x_i)$ indicates the value of the element FB of the second combination map 22.

The second generation section 12D puts the feature amount of each element FB of the second combination map 22 into Equation (2) above, thereby calculating a feature amount after the weighting for each element FE of the third combination map 42. Then, the second generation section 12D performs this processing on each element FB, thereby generating the third combination map 42 in which the feature amounts after the weighting are defined for each element FE. Then, the second generation section 12D transforms the third combination map 42 into L×H×W×256 and separates the third combination map 42 into a plurality of second feature maps 40.

In addition, as illustrated in FIG. 3A, the second generation section 12D may generate the second feature map 40 in which the feature amounts defined for each of the first feature maps 20 are added to the third combination map 42 (step S9 and step S10).

In such a case, the second generation section 12D may generate a plurality of second feature maps 40 by adding the feature amounts of the respective elements FE of the third combination map 42 and the feature amounts of the respective elements F of the first feature maps 20 for each corresponding element F (step S9 and step S10). That is, the second generation section 12D adds the feature amount of each element F of the first feature maps 20 to the third combination map 42.

Then, the second generation section 12D may transform the third combination map 42 after the feature amounts of the first feature maps 20 are added into L×H×W×256 and separate the third combination map 42 into a plurality of second feature maps 40.

As described above, the second generation section 12D further adds the feature amounts of the first feature map 20 to the third combination map 42, so that it is possible to generate a plurality of second feature maps 40 to which the feature amounts indicated in the first feature map 20 before linear embedding are added.

Returning to FIG. 1, a description will be continued. The detection section 12E detects the object included in the input image 18 by using the second feature maps 40.

Specifically, the detection section 12E detects at least one of the position and the type of the object in the input image 18 by using the second feature maps 40.

It is sufficient if the detection section 12E detects the object included in the input image 18 from the second feature map 40 by using a well-known method.

For example, the detection section 12E performs position estimation of the object and identification of a class including the object by using the second feature maps 40 by means of a well-known method. When performing the position estimation and the identification of the class, well-known convolutional process and resizing process may be performed in order to adjust the number of channels of the second feature map 40 (the number of types of feature amounts) or the size of the second feature map 40. Then, the detection section 12E may detect the object by using the second feature map 40 after the convolutional process and the resizing process are performed.

For the object position estimation and the identification of the class, for example, it is sufficient if the detection section 12E directly performs object class classification and regression of an occupation area of the object for each element F of the second feature map 40, like a single shot multibox detector (SSD). Furthermore, the detection section 12E may extract a candidate area, which is a candidate of the object, from the second feature map 40, and perform the object class classification and the regression of the occupation area of the object for each area, like Faster R-CNN. For these processes, for example, it is sufficient if a method disclosed in the following publication 1 or publication 2 is used.

Publication 1: Liu Wei, et al. "Ssd: Single shot multibox detector." European conference on computer vision. Springer, Cham, 2016.

Publication 2: Ren, Shaoqing, et al. "Faster r-cnn: Towards real-time object detection with region proposal networks." Advances in neural information processing systems. 2015

In addition, an object detected by the detection section 12E is not limited. The object, for example, is a vehicle, a person, an obstacle, and the like; however, the present embodiment is not limited thereto.

Next, the output control section 12F will be described. The output control section 12F outputs an object detection result of the detection section 12E to the output unit 16.

When the output unit 16 has the sound output function, the output unit 16 outputs sound indicating the object detection result. When the output unit 16 has the communication function, the output unit 16 transmits information indicating the object detection result to the external device via the network and the like.

When the output unit 16 has the display function, the output unit 16 displays a display image indicating the object detection result.

Figure 4:
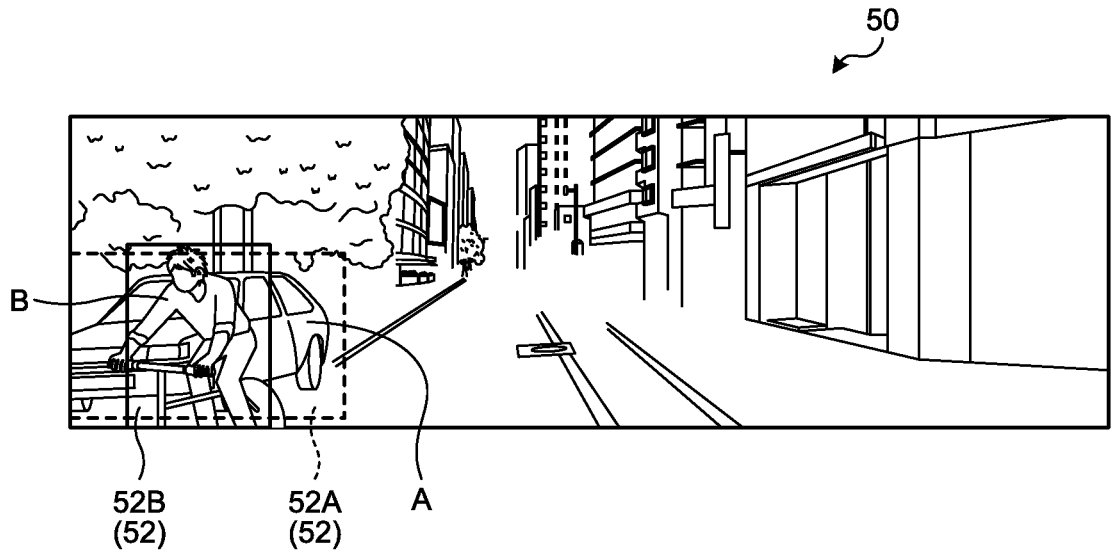
FIG. 4 is a schematic diagram of a display image.

FIG. 4 is a schematic diagram illustrating an example of a display image 50. The output unit 16, for example, displays the display image 50. The display image 50 includes object information 52. The object information 52 is information indicating the object detected by the detection section 12E. In other words, the object information 52 is information indicating the detection result of the detection section 12E. FIG. 4 illustrates, as an example, the display image 50 including object information 52A indicating an object A and object information 52B indicating an object B. For example, it is sufficient if the output control section 12F generates the display image 50 illustrated in FIG. 4 and displays the display image 50 on the output unit 16.

In addition, an output mode of the object information 52 is not limited to the mode illustrated in FIG. 4. For example, the object information 52 may include a frame line indicating the object information 52, a character indicating the object information 52, a highlighted image in which an objected represented by the object information 52 is highlighted, and the like.

Next, a procedure of the object detection process performed by the object detection apparatus 10 will be described.

Figure 5:
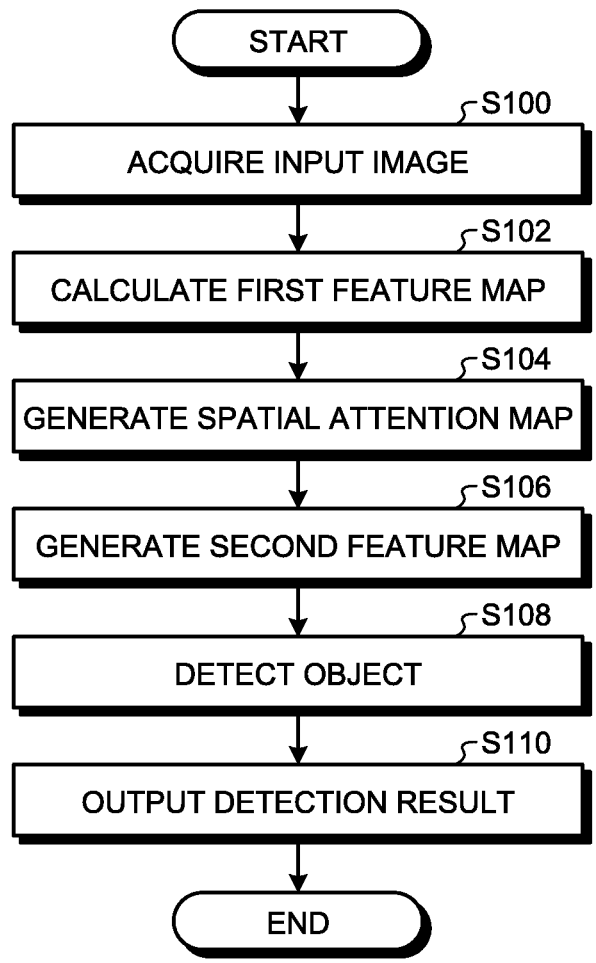
FIG. 5 is a flowchart illustrating the flow of an object detection process.

FIG. 5 is a flowchart illustrating an example of the flow of the object detection process performed by the object detection apparatus 10.

The acquisition section 12A acquires the input image 18 (step S100).

Next, the calculation section 12B calculates the first feature maps 20 from the input image 18 acquired at step S100 (step S102). For example, the calculation section 12B calculates the first feature maps 20 from the input image 18 by repeating the convolutional operation using the CNN.

The first generation section 12C generates the spatial attention map 30 on the basis of the first feature maps 20 calculated at step S102 (step S104).

The second generation section 12D performs weighting on each of the first feature maps 20 calculated at step S102 in accordance with the first weighted value indicated for the spatial attention map 30 generated at step S104, thereby generating the second feature map 40 corresponding to each of the first feature maps 20 (step S106).

Next, the detection section 12E detects the object included in the input image 18 by using the second feature map 40 (step S108).

Then, the output control section 12F outputs a detection result of the object of step S108 to the output unit 16 (step S110). Then, the present routine is ended.

As described above, the object detection apparatus 10 of the present embodiment includes the calculation section 12B, the first generation section 12C, the second generation section 12D, and the detection section 12E. The calculation section 12B calculates, from the input image 18, the first feature maps 20 having different feature amounts of at least some elements FA. The first generation section 12C generates the spatial attention map 30 on the basis of the first feature maps 20. The spatial attention map 30 is a map for which a higher first weighted value is defined for an element having a higher relation in terms of the first space P1 defined by the positional directions (the first positional direction H and the second positional direction W) in the first feature map 20 and the relational direction L between the first feature maps 20. The second generation section 12D generates the second feature maps 40 by performing weighting on each of the first feature maps 20 in accordance with the first weighted value indicated for the spatial attention map 30. The detection section 12E detects the object included in the input image 18 by using the second feature maps 40.

In the related art, an object is detected by combining a plurality of images having different resolutions or calculating the sum of the elements included in the images. Specifically, there has been known a technology called an image pyramid method in which a scale is fixed and features are extracted from the images having different resolutions. However, in the image pyramid method, it is necessary to independently extract features of the images having respective resolutions, resulting in an increase in a processing load. In this regard, there has been proposed a technology in which a plurality of feature maps, which are a plurality of intermediate layers generated in the CNN, are used for object detection, instead of the image pyramid method. For example, an intermediate layer to be used for object detection is selected in accordance with the size of an object to be detected and the object is detected using a map combined with the selected intermediate layer.

However, in the related art, the object detection is performed using the combination of the intermediate layers or the calculation result of the sum of the elements of the intermediate layers. As described above, in the related art, since the object detection is performed in accordance with local features, object detection accuracy may be reduced.

On the other hand, the object detection apparatus 10 of the present embodiment generates the spatial attention map 30 for which a higher first weighted value is defined for an element having a higher relation in terms of the first space P1 defined by the first positional direction H, the second positional direction W, and the relational direction L. The object detection apparatus 10 generates the second feature map 40 by performing weighting on the first feature map 20 by using the generated spatial attention map 30. Then, the object detection apparatus 10 performs object detection by using the generated second feature map 40.

Therefore, the object detection apparatus 10 of the present embodiment performs the object detection by using the second feature map 40 in which the feature amounts of an area important in terms of the first space P1 are increased (made large) in the first feature maps 20. That is, the object detection apparatus 10 of the present embodiment performs the object detection by using the second feature map 40 with the relation in terms of the relational direction L such as an increase or decrease direction in a resolution and a scale direction added. Thus, in the object detection apparatus 10 of the present embodiment, the relation in the relational direction L is added, so that it is possible to perform the object detection in accordance with global features as compared with the related art.

Consequently, the object detection apparatus 10 of the present embodiment can improve object detection accuracy.

Second Embodiment

In the present embodiment, a description will be provided for a mode in which object detection is performed using a third feature map in which relation in a temporal direction is further added to the second feature map 40.

In the present embodiment, there is a case where the same reference characteristics or numerals are used to designate the same components as those of the first embodiment and a detailed description thereof is omitted.

Figure 6:
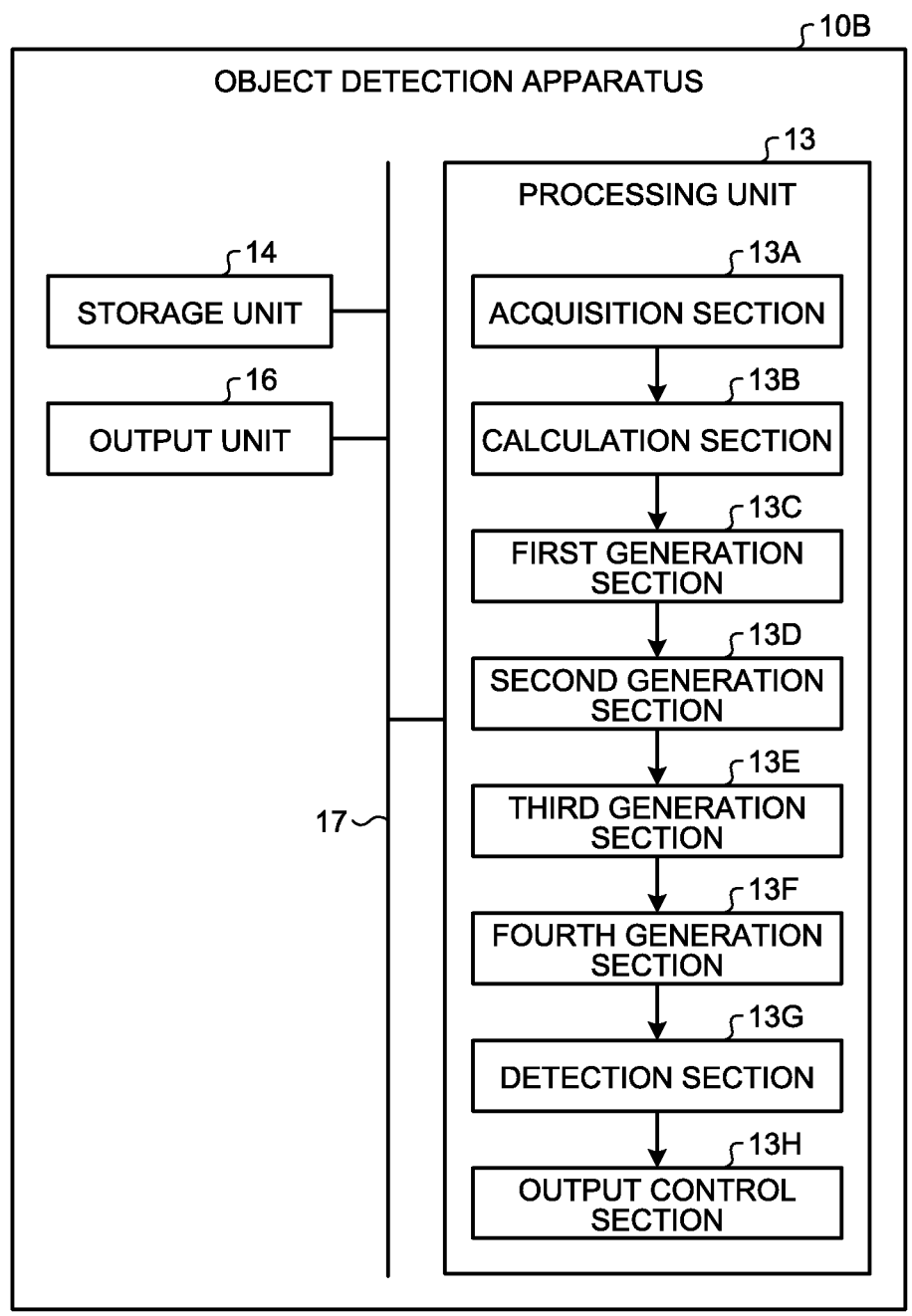
FIG. 6 is a block diagram of an object detection apparatus.

FIG. 6 is a block diagram illustrating an example of a configuration of an object detection apparatus 10B of the present embodiment.

The object detection apparatus 10B includes a processing unit 13, the storage unit 14, and the output unit 16. The processing unit 13, the storage unit 14, and the output unit 16 are connected to one another via the bus 17 so that data or signals can be exchanged. The object detection apparatus 10B is the same as the object detection apparatus 10 of the aforementioned embodiment, except that the processing unit 13 is provided instead of the processing unit 12.

The processing unit 13 includes an acquisition section 13A, a calculation section 13B, a first generation section 13C, a second generation section 13D, a third generation section 13E, a fourth generation section 13F, a detection section 13G, and an output control section 13H.

The acquisition section 13A, the calculation section 13B, the first generation section 13C, the second generation section 13D, the third generation section 13E, the fourth generation section 13F, the detection section 13G, and the output control section 13H, for example, are implemented by one or a plurality of processors. For example, each of the sections may be implemented by execution of computer programs by a processor such as a CPU, that is, software. Each of the sections may be implemented by a processor such as a dedicated IC, that is, hardware. Each of the sections may be implemented using software and hardware. In the case of using a plurality of processors, each processor may implement one of the sections or two or more of the sections.

Figure 7:
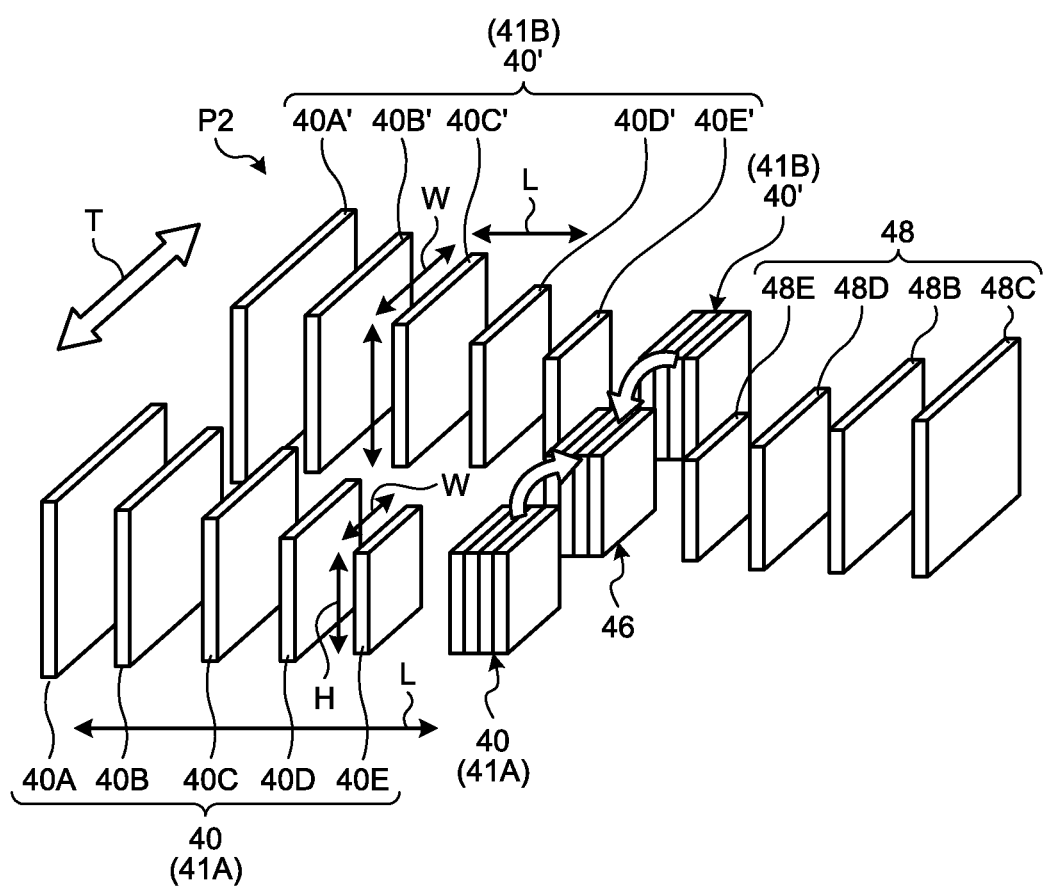
FIG. 7 is a schematic diagram of a process performed by a processing unit.

FIG. 7 is a schematic diagram of a process performed by the processing unit 13 of the present embodiment.

In the present embodiment, the processing unit 13 generates a plurality of second feature maps 40 in the same manner as that in the aforementioned embodiment. Then, the processing unit 13 generates a temporal attention map 46 by using a first group 41A, which is a group of the second feature maps 40 generated this time, and a second group 41B which is a group of second feature maps 40 (referred to as second feature maps 40') generated in the past. Then, the processing unit 13 generates a third feature map 48 by performing weighting on the second feature maps 40 (the second feature maps 40') included in the first group 41A or the second group 41B by using the temporal attention map 46. The processing unit 13 detects the object included in the input image 18 by using the third feature map 48. Details of the temporal attention map 46 and the third feature map 48 will be described below.

Returning to FIG. 6, each section of the processing unit 13 will be described in detail.

The acquisition section 13A, the calculation section 13B, the first generation section 13C, and the second generation section 13D are the same as the acquisition section 12A, the calculation section 12B, the first generation section 12C, and the second generation section 12D of the aforementioned embodiment.

That is, the acquisition section 13A acquires the input image 18. The calculation section 13B generates a plurality of first feature maps 20 from the input image 18. The first generation section 13C generates a spatial attention map 30 on the basis of the first feature maps 20. The second generation section 13D performs weighting on each of the first feature maps 20 in accordance with a first weighted value indicated for the spatial attention map 30, thereby generating a second feature map 40 corresponding to each of the first feature maps 20.

In the present embodiment, the second generation section 13D outputs the generated second feature maps 40 to the third generation section 13E, and stores the generated second feature maps 40 in the storage unit 14. The storage unit 14 thus stores therein the second feature maps 40 generated in the past.

The third generation section 13E generates the temporal attention map 46 on the basis of the first group 41A of the second feature maps 40 generated this time by the second generation section 13D, and the second group 41B of the second feature map 40' generated in the past. The second feature map 40' and the second feature map 40 are both "second feature maps" generated by the second generation section 13D in the same manner, and differ in at least one of the generation timing and the input image 18 used for the generation.

FIG. 8A is an explanation diagram of an example of the generation of the temporal attention map 46 and the generation the third feature map 48.

The temporal attention map 46 is generated on the basis of the first group 41A and the second group 41B.

Figure 8B:
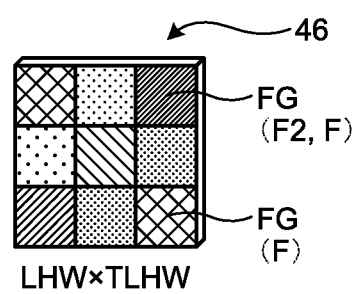
FIG. 8B is a schematic diagram of the temporal attention map.

FIG. 8B is a schematic diagram illustrating an example of the temporal attention map 46. The temporal attention map 46 is a map for which a weighted value is defined for each element F. The third generation section 13E generates the temporal attention map 46 by obtaining weighted values of all the elements F between the first group 41A and the second group 41B. The weighted values of the temporal attention map 46 are derived by learning the network and automatically learning the relation in the temporal direction T. Therefore, the higher the weighted value indicated for each element F of the temporal attention map 46, the higher the relation in the temporal direction T, and the lower the weighted value indicated for each element F of the temporal attention map 46, the lower the relation in the temporal direction T. In other words, the generated temporal attention map 46 is a map for which a higher weighted value (a second weighted value) is defined for an element F having a higher relation in the temporal direction T. Furthermore, the temporal attention map 46 is a map for which a lower weighted value is defined for an element F having a lower relation in the temporal direction T.

As described above, the second feature map 40 is a map generated using the spatial attention map 30. Therefore, it can be said that the temporal attention map 46 is a map for which a higher second weighted value is defined for an element F having a higher relation in terms of a second space.

As illustrated in FIG. 8A, a second space P2 is a multi-dimensional space defined by the first positional direction H, the second positional direction W, the relational direction L, and the temporal direction T.

The weighted value of each element F of the temporal attention map 46 is updated by generation (learning) by the third generation section 13E. The higher the updated weighted value of the element F, the higher the relation in terms of the second space P2.

In the present embodiment, the third generation section 13E generates the temporal attention map 46 from the second feature maps 40 belonging to the first group 41A and the second feature maps 40' belonging to the second group 41B, by the following method.

Specifically, the third generation section 13E calculates the inner product result of a vector sequence of the feature amounts along the temporal direction T, the relational direction L, and the positional directions (the first positional direction H and the second positional direction W). FIG. 8A illustrates an example of a case where the type of the feature amounts is 256.

Then, the third generation section 13E generates a temporal attention map 46 in which the inner product result of each element FD is defined for each element FG as the second weighted value (see FIG. 8B).

In addition, the third generation section 13E may generate the temporal attention map 46 by using a combination map for which each of the second feature maps 40 belonging to the first group 41A and the second feature maps 40' belonging to the second group 41B has been subjected to linear embedding.

Specifically, for example, the third generation section 13E generates a fourth combination map 44 in which the respective feature amounts of the elements FD included in the element group are linearly embedded for each element group of the elements FD corresponding to each other between the second feature maps 40 (a second feature map 40B to a second feature map 40E) belonging to the first group 41A (step S20).

Figure 8C:
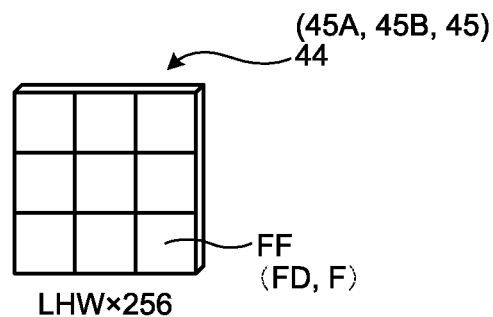
FIG. 8C is a schematic diagram of a fourth combination map.

FIG. 8C is a schematic diagram illustrating an example of the fourth combination map 44. Elements FF constituting the fourth combination map 44 are composed of a group of a plurality of elements FD of the second feature map 40. Therefore, the fourth combination map 44 is a tensor of LHW×256. The feature amounts of the respective elements FF included in the fourth combination map 44 are values obtained by linearly embedding the respective feature amounts of the elements FD, which are included in each element group, in each element group of the elements FD corresponding to each other between the second feature maps 40.

In the present embodiment, it is sufficient if the third generation section 13E generates the fourth combination map 44 by using the well-known linear embedding method.

Returning to FIG. 8A, a description will be continued. Furthermore, the third generation section 13E generates a fifth combination map 45 by using the second feature maps 40' belonging to the second group 41B. The generation of the fifth combination map 45 is the same as that of the fourth combination map 44, except that the second feature maps 40' are used instead of the second feature maps 40. In addition, the third generation section 13E generates a plurality of fifth combination maps 45 (a fifth combination map 45A and a fifth combination map 45B), which have different weight values for the linear embedding, from the second feature maps 40' belonging to the second group 41B (step S21 and step S22). Therefore, the configuration of the fifth combination map 45 is the same as that of the fourth combination map 44 as illustrated in FIG. 8C.

Returning to FIG. 8A, a description will be continued. Each element group of the elements FD corresponding to each other between the second feature maps 40 is referred to as "x". By so doing, the fourth combination map 44 and the fifth combination map 45 (the fifth combination map 45A and the fifth combination map 45B) composed of the elements FF in the element group are represented by a function using the element group "x". Specifically, for example, the fourth combination map 44 is represented by f(x), the fifth combination map 45A is represented by g(x), and the fifth combination map 45B is represented by h(x).

Then, the third generation section 13E generates the temporal attention map 46 in which the inner product result of a vector sequence of the feature amounts along the temporal direction T is defined as the second weighted value for each element FF corresponding to each other between the fourth combination map 44 and the fifth combination map 45A (step S23, step S24, and step S25). Therefore, the temporal attention map 46 illustrated in FIG. 8B is generated.

In addition, it is sufficient if the third generation section 13E uses the well-known Softmax function and generates the temporal attention map 46 by using the aforementioned Equation (1), similarly to the first generation section 12C of the aforementioned embodiment.

In such a case, in the aforementioned Equation (1), $\alpha_{i,j}$ indicates a tensor of LHW×TLHW. $f(X_i)$ indicates a tensor of LHW×256. $g(x_j)$ indicates a tensor of TLHW×256. $f(X_i)^T$ is the transposition of $f(X_i)$ and indicates a tensor of 256× LHW. i and j indicate the position of LHW. j indicates the position of TLHW.

The third generation section 13E puts the feature amounts of each element FF corresponding to each other between the fourth combination map 44 and the fifth combination map 45A into the aforementioned Equation (1). With this processing, the third generation section 13E calculates the second weighted value for each element FG of the temporal attention map 46. Then, the third generation section 13E generates the temporal attention map 46 in which the second weighted value is defined for each element FG. Therefore, the temporal attention map 46 is the tensor of LHW×TLHW (see FIG. 8B). T indicates the temporal direction T. For example, T may be represented by the number of a plurality of input images 18 that differ in a capturing timing (the number of frames).

Returning to FIG. 6, a description will be continued. The fourth generation section 13F generates a plurality of third feature maps 48 by performing weighting on each of the second feature maps 40 (or second feature maps 40'), which are included in the first group 41A or the second group 41B, in accordance with the second weighted value indicated for the temporal attention map 46.

For example, as illustrated in FIG. 8A, the fourth generation section 13F uses the fifth combination map 45B combined with the second feature maps 40' belonging to the second group 41B. Specifically, the fourth generation section 13F performs weighting on the fifth combination map 45B by using the temporal attention map 46 (step S25 and step S26), thereby generating the third feature map 48 (step S27).

For example, the fourth generation section 13F performs weighting on the feature amounts of each element FF included in the fifth combination map 45B in accordance with the second weighted value defined for the corresponding element FG indicated for the temporal attention map 46.

Specifically, the fourth generation section 13F performs addition or multiplication of the second weight value of the corresponding element FG in the temporal attention map 46 on the feature amount of each element FF included in the fifth combination map 45B. In the present embodiment, the multiplication will be described as an example. Then, the fourth generation section 13F obtains the multiplication result as a feature amount after the weighting for each element FF. In the same manner, the fourth generation section 13F generates a fifth combination map 47 by performing the same processing on all the elements FF of the fifth combination map 45B.

Figure 8D:
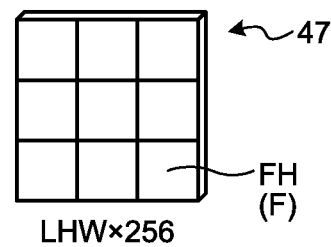
FIG. 8D is a schematic diagram of a fifth combination map.

FIG. 8D is a schematic diagram of an example of the fifth combination map 47. The fifth combination map 47 is composed of a plurality of elements FH. The elements FH correspond to the elements FF included in the fifth combination map 45B. That is, each element FH of the fifth combination map 47 corresponds to each of the element groups of the elements FA corresponding to each other between the first feature maps 20. Therefore, the fifth combination map 47 is the tensor of LHW×256. Furthermore, feature amounts after the weighting using the temporal attention map 46 are defined for the elements FH constituting the fifth combination map 47.

Then, the fourth generation section 13F transforms the fifth combination map 47 into L×H×W×256 and separates the fifth combination map 47 into the third feature maps 48.

Figure 8E:
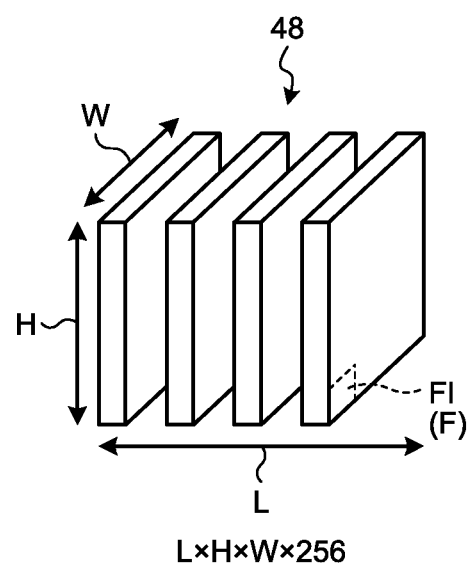
FIG. 8E is a schematic diagram of a third feature map.

FIG. 8E is a schematic diagram illustrating an example of the third feature maps 48. Values obtained by correcting the feature amounts of the elements FA of the first feature map 20 by the spatial attention map 30 and the temporal attention map 46 are defined for elements FI constituting the third feature maps 48. In other words, the elements FI constituting each of the third feature maps 48 have a characteristic that the feature amount of the element FI having a relation in terms of the first space P1 and the second space P2 has a value higher (larger) than that of the feature amount of other elements FI within the element FI.

Specifically, it is sufficient if the fourth generation section 13F generates the third feature maps 48 by using the aforementioned Equation (2).

In such a case, in the aforementioned Equation (2), "y" indicates the value of the element FI of the third feature maps 48. $α_{j,i}$, j, and i are the same as those of the aforementioned Equation (1) used in the present embodiment. $h(x_i)$ indicates the value of the element FF of the fifth combination map 45B.

The fourth generation section 13F puts the feature amount of each element FF of the fifth combination map 45B into the aforementioned Equation (2), thereby calculating a feature amount after the weighting for each element F. Then, the fourth generation section 13F performs this processing on each element F, thereby generating a combination map for which the feature amounts after the weighting are defined for each element F. Then, the fourth generation section 13F transforms the combination map into L×H×W×256, thereby generating the third feature map 48 in which the feature amounts after the weighting are defined for each element FI.

Returning to FIG. 6, a description will be continued. The detection section 13G detects the object included in the input image 18 by using the third feature maps 48. That is, the third generation section 13E detects the object included in the input image 18 by using the third feature maps 48 generated from the second feature maps 40.

The third generation section 13E detects the object included in the input image 18 in the same manner as the detection section 12E of the aforementioned embodiment, except that the third feature maps 48 are used instead of the second feature maps 40.

The output control section 13H outputs an object detection result of the detection section 13G to the output unit 16.

When the output unit 16 has the sound output function, the output unit 16 outputs sound indicating the object detection result. When the output unit 16 has the communication function, the output unit 16 transmits information indicating the object detection result to the external device via the network and the like. When the output unit 16 has the display function, the output unit 16 displays a display image indicating the object detection result. In such a case, the output unit 16, for example, displays the display image 50 illustrated in FIG. 4.

Next, a procedure of the object detection process performed by the object detection apparatus 10B will be described.

Figure 9:
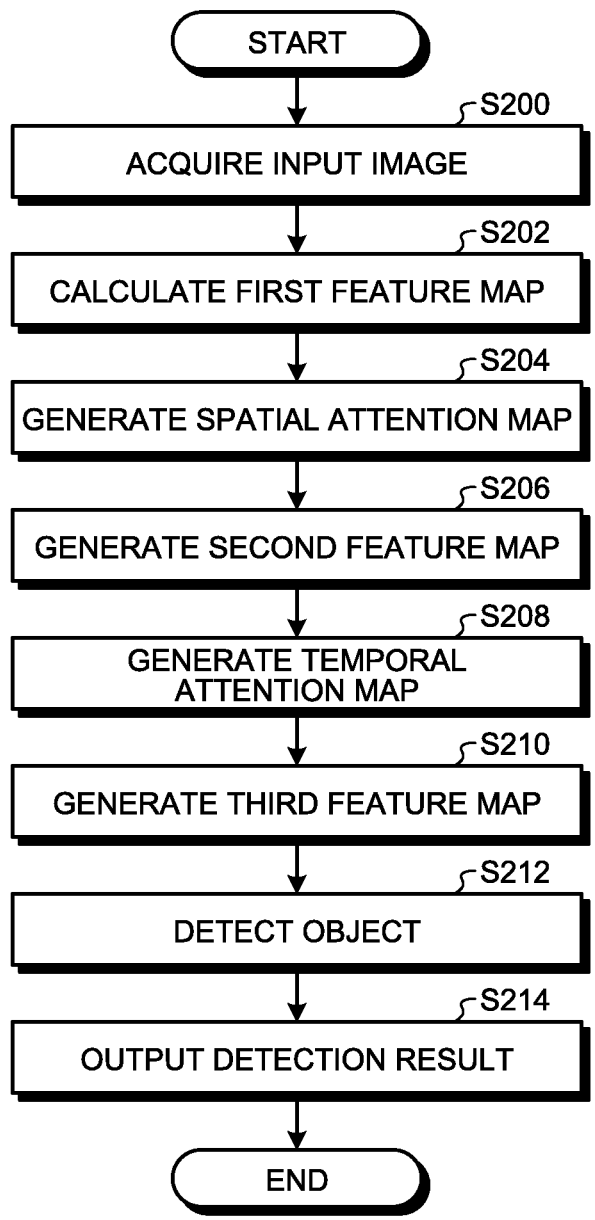
FIG. 9 is a flowchart of an object detection process.

FIG. 9 is a flowchart illustrating an example of the flow of the object detection process performed by the object detection apparatus 10B.

The acquisition section 13A acquires the input image 18 (step S200).

Next, the calculation section 13B calculates the first feature maps 20 from the input image 18 acquired at step S200 (step S202). For example, the calculation section 13B calculates the first feature maps 20 from the input image 18 by repeating the convolutional operation using the CNN.

The first generation section 13C generates the spatial attention map 30 on the basis of the first feature maps 20 calculated at step S202 (step S204).

The second generation section 13D performs weighting on each of the first feature maps 20 calculated at step S202 in accordance with the first weighted value indicated for the spatial attention map 30 generated at step S204, thereby generating the second feature maps 40 corresponding to the respective first feature maps 20 (step S206).

The second generation section 13D generates the temporal attention map 46 by using the first group 41A of the second feature maps 40 generated this time at step S206, and the second group 41B of the second feature maps 40' generated in the past (step S208).

Next, the fourth generation section 13F generates the third feature maps 48 by performing weighting on the second feature maps 40 (the second feature maps 40') belonging to the first group 41A or the second group 41B in accordance with the second weighted value indicated for the temporal attention map 46 (step S210).

Next, the detection section 13G detects the object included in the input image 18 by using the third feature maps 48 generated at step S210 (step S212).

Then, the output control section 13H outputs a detection result of the object of step S212 to the output unit 16 (step S214). Then, the present routine is ended.

As described above, the object detection apparatus 10B of the present embodiment includes the third generation section 13E and the fourth generation section 13F, in addition to the configuration of the aforementioned embodiment. Furthermore, the storage unit 14 stores therein the second feature maps 40.

The third generation section 13E generates the temporal attention map 46, for which a higher second weighted value is defined for elements having a higher relation in the temporal direction T between the first group 41A and the second group 41B, on the basis of the first group 41A of the second feature maps 40 generated this time and the second group 41B of the second feature maps 40' generated in the past. The fourth generation section 13F generates the third feature map 48 by performing weighting on each of the second feature maps 40 (second feature maps 40') included in the first group 41A or the second group 41B in accordance with the second weighted value indicated for the temporal attention map 46. Then, the detection section 13G detects the object included in the input image 18 by using the third feature map 48 generated from the second feature maps 40.

As described above, the object detection apparatus 10B of the present embodiment performs the object detection by using the third feature map 48 in which the feature amounts of an area important in the second space P2 are increased in the first feature map 20. As described above, the second space P2 is a multi-dimensional space where the temporal direction T is further defined for the first space P1.

Therefore, in the object detection apparatus 10B of the present embodiment, the relation in the temporal direction T is added as compared with the related art, so that it is possible to perform the object detection in accordance with more global features as compared with the aforementioned embodiment.

Consequently, the object detection apparatus 10B of the present embodiment can further improve object detection accuracy.

MODIFICATION EXAMPLE

A target, to which the object detection apparatus 10 and the object detection apparatus 10B of the aforementioned embodiments are applied, is not limited. The object detection apparatus 10 and the object detection apparatus 10B are applied to various apparatuses, which perform various processes, by using the detection result of the object included in the input image 18.

Figure 10:
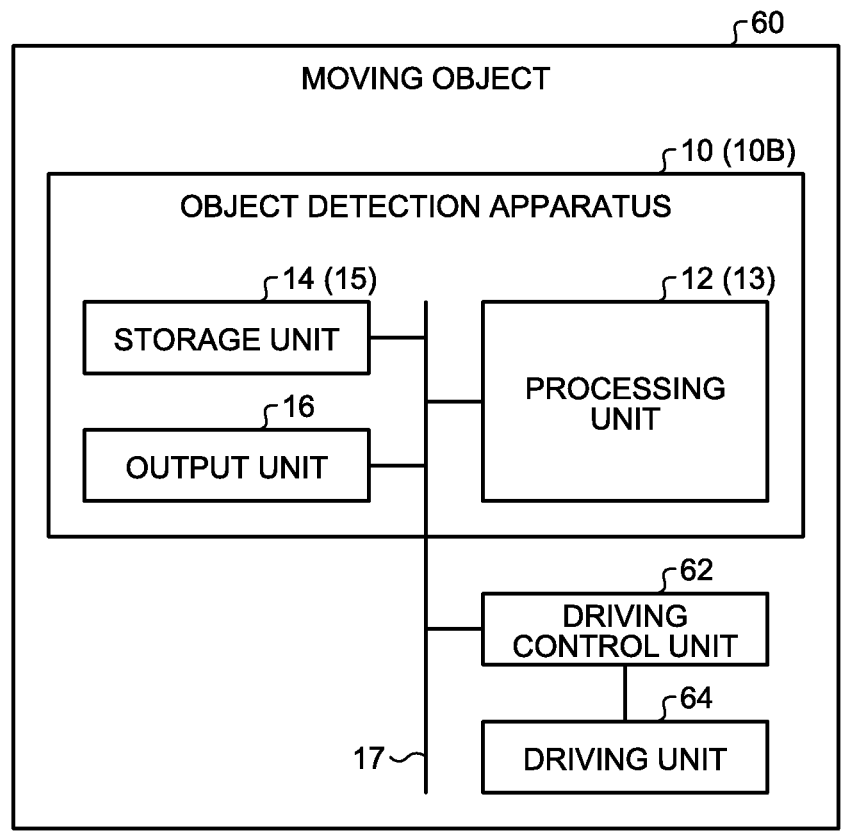
FIG. 10 is a diagram illustrating an application mode of the object detection apparatus.

FIG. 10 is a diagram illustrating an example of an application mode of the object detection apparatus 10 and the object detection apparatus 10B. FIG. 10 illustrates an example of a mode in which the object detection apparatus 10 or the object detection apparatus 10B is mounted on a moving object 60.

The moving object 60 is an object that can be moved by running. The moving object 60 is, for example, a vehicle (a motorcycle, an automatic four-wheel vehicle, a bicycle), a carriage, a robot, and the like. The moving object 60 is, for example, a moving object that runs through a driving operation of a person or a moving object that can automatically run (autonomously run) without a driving operation of a person. In the present modification example, a case where the moving object 60 is a moving object that can autonomously run will be described as an example.

In addition, the object detection apparatus 10 and the object detection apparatus 10B are not limited to the mode in which they are mounted on the moving object 60. The object detection apparatus 10 and the object detection apparatus 10B may be mounted on a stationary object. The stationary object is an object fixed on the ground. The stationary object includes a non-movable object or an object in a stationary state with respect to the ground. The stationary object is, for example, a parking vehicle, a road sign, and the like. Furthermore, the object detection apparatus 10 and the object detection apparatus 10B may be mounted on a cloud server that performs processing on a cloud.

The moving object 60 includes the object detection apparatus 10 or the object detection apparatus 10B, a driving control unit 62, and a driving unit 64. The configurations of the object detection apparatus 10 and the object detection apparatus 10B are the same as those in the aforementioned embodiments. The driving control unit 62 and the driving unit 64, and the processing unit 12 or the processing unit 13 are connected to each other via the bus 17 so that data or signals can be exchanged.

The driving unit 64 is a device mounted on the moving object 60 to drive the moving object 60. The driving unit 64 is, for example, an engine, a motor, a wheel, a handle position changing unit and the like.

The driving control unit 62 controls the driving unit 64. The driving unit 64 is driven under the control of the driving control unit 62.

For example, the processing unit 12 or the processing unit 13 outputs information indicating a detection result of an object to the driving control unit 62. The driving control unit 62 controls the driving unit 64 by using the received information indicating the detection result of the object. For example, the driving control unit 62 controls the driving unit 64 for running by avoiding the object indicated by the information indicating the detection result of the object and maintaining a distance with the object. Therefore, for example, the driving control unit 62 can control the driving unit 64 such that the moving object 60 autonomously runs according to the detection result of the object.

In addition, as the input image 18 used by the processing unit 12 or the processing unit 13, for example, it is sufficient if an image captured by a capturing device mounted on the moving object 60 or a captured image acquired from the external device is used.

In addition, an object, to which the object detection apparatus 10 and the object detection apparatus 10B of the aforementioned embodiments are applied, is not limited to the moving object 60.

For example, the object detection apparatus 10 and the object detection apparatus 10B may be applied to a detection apparatus and the like that detect an object included in an image captured by a security camera and the like.

Next, an example of a hardware configuration of the object detection apparatus 10 and the object detection apparatus 10B of the aforementioned embodiments will be described.

Figure 11:
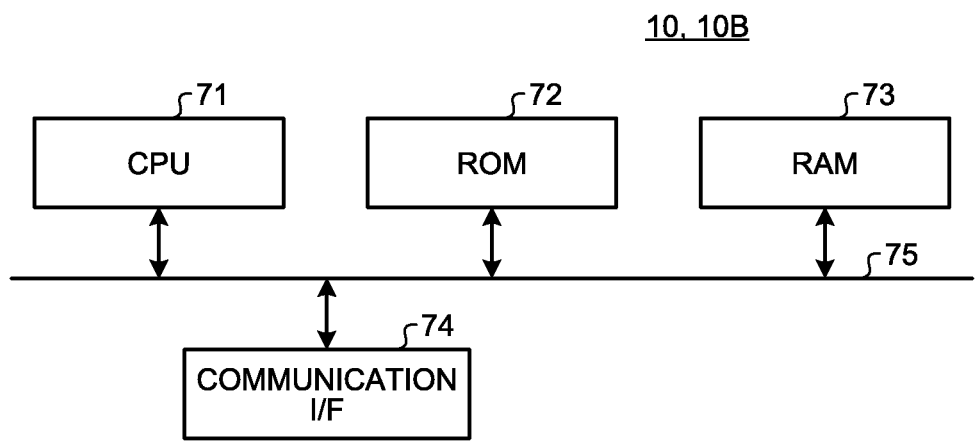
FIG. 11 is a hardware configuration diagram of the object detection apparatus.

FIG. 11 is an example of a hardware configuration diagram of the object detection apparatus 10 and the object detection apparatus 10B of the aforementioned embodiments.

The object detection apparatus 10 and the object detection apparatus 10B of the aforementioned embodiments have a configuration in which a central processing unit (CPU) 71, a read only memory (ROM) 72, a random access memory (RAM) 73, an I/F 74, and the like are connected to one another by a bus 75, and have a hardware configuration using an ordinary computer.

The CPU 71 is an arithmetic unit that controls the object detection apparatus 10 and the object detection apparatus 10B of the aforementioned embodiments. The ROM 72 stores therein a computer program and the like for performing various processes by the CPU 71. The RAM 73 stores therein data required for various processes by the CPU 71. The I/F 74 is an interface for connecting to the output unit 16, the driving control unit 62, and the like and transmitting and receiving data.

In the object detection apparatus 10 and the object detection apparatus 10B of the aforementioned embodiments, the CPU 71 reads the computer program from the ROM 72 onto the RAM 73 and executes the computer program, so that the aforementioned functions are performed on the computer.

In addition, the computer program for performing the aforementioned processes performed in the object detection apparatus 10 and the object detection apparatus 10B of the aforementioned embodiments may be stored in a hard disk drive (HDD). Furthermore, the computer program for performing the aforementioned processes performed in the object detection apparatus 10 and the object detection apparatus 10B of the aforementioned embodiments may be incorporated in the ROM 72 in advance and provided.

Furthermore, the computer program for performing the aforementioned processes performed in the object detection apparatus 10 and the object detection apparatus 10B of the aforementioned embodiments may be stored in a computer readable storage medium, such as a CD-ROM, a CD-R, a memory card, a digital versatile disc (DVD), and a flexible disk (FD), in the form of an installable or an executable file, and may be provided as a computer program product. Furthermore, the computer program for performing the aforementioned processes performed in the object detection apparatus 10 and the object detection apparatus 10B of the aforementioned embodiments may be stored in a computer connected to a network such as the Internet and may be provided by being downloaded via the network. Furthermore, the computer program for performing the aforementioned processes performed in the object detection apparatus 10 and the object detection apparatus 10B of the aforementioned embodiments is obtainable via the network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An object detection apparatus comprising:
a hardware processor configured to:
calculate a plurality of first feature maps from an image, at least one feature map having a different amount of an element included in an input image than at least one other feature map from the plurality of first feature maps;
generates a plurality of first combination maps by subjecting each element group of the first feature maps to a linear embedding process;
generate a spatial attention map for which a higher first weighted value is defined for a spatial attention map element comprising a higher direction relation in terms of a first space defined by a positional direction in the first feature maps and a relational direction between the first feature maps than a weighted value defined for another spatial attention map element, based at least in part on the first feature maps and the plurality of first combination maps;
generate a plurality of second feature maps by performing weighting on each of the first feature maps in accordance with a first weighted value indicated for the spatial attention map; and
detect an object included in the input image by using the second feature maps.

2. The object detection apparatus according to claim 1, wherein:
the hardware processor calculates the first feature maps that differ in at least one of a resolution and a scale, and
the relational direction is an increase or decrease direction of the resolution or a magnification or reduction direction of the scale.

3. The object detection apparatus according to claim 1, wherein the hardware processor generates the spatial attention map for which an inner product result of a vector sequence of the feature amounts along each of the relational direction and the positional direction in each element group of corresponding elements of the first feature maps is defined for each element as the first weighted value.

4. The object detection apparatus according to claim 1, wherein
the plurality of first combination maps have different weight values at the linear embedding, and the hardware processor:
generates the spatial attention map for which an inner product result of a vector sequence of the feature amounts along each of the relational direction and the positional direction in each element corresponding to each other between the first combination maps is defined for each element as the first weighted value.

5. The object detection apparatus according to claim 4, wherein the hardware processor:
generates a second combination map in which respective feature amounts of the elements included in each element group are linearly embedded for each element group of the corresponding elements of the first feature maps, the second combination map having a different weight value at the linear embedding from the weight value of the first combination map, and
generates the second feature maps by performing weighing on each of the feature amounts of each element included in the second combination map in accordance with the first weighted value indicated for the spatial attention map.

6. The object detection apparatus according to claim 5, wherein the hardware processor generates the second feature maps in which the feature amounts of each element of a third combination map that is weighted in accordance with the first weighted value indicated for the spatial attention map and the feature amounts of each element of the first feature maps are added to the respective feature amounts of each element included in the second combination map, for each corresponding element.

7. The object detection apparatus according to claim 1, further comprising:
a storage unit configured to store therein the second feature maps, wherein
the hardware processor is further configured to:
generate a temporal attention map for which a higher second weighted value is defined for a temporal attention map element comprising a higher relation in a temporal direction between a first group of the second feature maps generated this time and a second group of the second feature maps generated in the past on the basis of the first group and the second group,
generate third feature maps by performing weighting on each of the second feature maps included in the first group or the second group in accordance with a second weighted value indicated for the temporal attention map, and
detect the object included in the input image by using a plurality of the third feature maps generated from the second feature maps.

8. The object detection apparatus according to claim 1, wherein the hardware processor calculates the first feature maps from the input image by using a convolutional neural network.

9. A system comprising:
the object detection apparatus according to claim 1; and
a controller configured to control an operation processor configured to operate the system based at least in part on information indicating a detection result of an object.

10. An object detection method performed by a computer, the method comprising:
calculating a plurality of first feature maps from an image, at least one feature map having a different amount of an element included in an input image than at least one other feature map from the plurality of first feature maps;
generating a plurality of first combination maps by subjecting each element group of the first feature maps to a linear embedding process;
generating a spatial attention map for which a higher first weighted value is defined for a spatial attention map element comprising a higher relation in terms of a first space defined by a positional direction in the first feature maps and a relational direction between the first feature maps than a weighted value defined for another spatial attention map element, based at least in part on the first feature maps and the plurality of first combination maps;
generating a plurality of second feature maps by performing weighting on each of the first feature maps in accordance with a first weighted value indicated for the spatial attention map; and detecting an object included in the input image by using the second feature maps.

11. A computer program product having a non-transitory computer readable medium comprising instructions, wherein the instructions, when executed by a computer, cause the computer to perform:
- calculating a plurality of first feature maps from an image, at least one feature map having a different amount of an element included in an input image than at least one other feature map from the plurality of first feature maps;
- generating a plurality of first combination maps by subjecting each element group of the first feature maps to a linear embedding process;
- generating a spatial attention map for which a higher first weighted value is defined for a spatial attention map element comprising a higher relation in terms of a first space defined by a positional direction in the first feature maps and a relational direction between the first feature maps than a weighted value defined for another spatial attention map element, based at least in part on the first feature maps and the plurality of first combination maps;
- generating a plurality of second feature maps by performing weighting on each of the first feature maps in accordance with a first weighted value indicated for the spatial attention map; and
- detecting an object included in the input image by using the second feature maps.

* * * * *